(12) United States Patent
George (10) Patent No.: US 11,274,937 B2
(45) Date of Patent: Mar. 15, 2022

(54) METHODS, SYSTEMS, AND VEHICLES FOR PROVIDING WIND ALERTS TO A DRIVER OF A VEHICLE

(71) Applicant: Toyota Motor North America, Inc., Plano, TX (US)

(72) Inventor: Livesey George, Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 173 days.

(21) Appl. No.: 16/543,108

(22) Filed: Aug. 16, 2019

(65) Prior Publication Data

US 2021/0048310 A1 Feb. 18, 2021

(51) Int. Cl.
| | |
|---|---|
| *G01C 21/36* | (2006.01) |
| *B62D 25/20* | (2006.01) |
| *B60W 50/14* | (2020.01) |
| *B62D 63/04* | (2006.01) |
| *H04L 29/08* | (2006.01) |
| *H04L 67/12* | (2022.01) |

(52) U.S. Cl.
CPC ......... *G01C 21/3694* (2013.01); *B60W 50/14* (2013.01); *B62D 25/209* (2013.01); *B62D 63/04* (2013.01); *G01C 21/3697* (2013.01); *H04L 67/12* (2013.01)

(58) Field of Classification Search
CPC .................................................. G01C 21/3694
See application file for complete search history.

(56) References Cited

U.S. PATENT DOCUMENTS

| | | | |
|---|---|---|---|
| 5,259,640 A | 11/1993 | Mackey | |
| 9,357,114 B1* | 5/2016 | Whitehead | ................ B60R 1/00 |
| 9,948,898 B2 | 4/2018 | Barfield, Jr. et al. | |
| 10,150,505 B2* | 12/2018 | Herzog | ............. G06K 9/00791 |
| 10,249,189 B1 | 4/2019 | Grant | |
| 2008/0067263 A1* | 3/2008 | Modlin | ................. A01M 1/245 |
| | | | 239/70 |
| 2015/0347959 A1* | 12/2015 | Skaaksrud | ......... H04B 17/3913 |
| | | | 705/333 |
| 2016/0251005 A1* | 9/2016 | Morselli | ................... B60T 7/20 |
| | | | 701/50 |
| 2017/0036600 A1* | 2/2017 | Whitehead | ............. H04N 5/247 |
| 2017/0107090 A1* | 4/2017 | Mondal | ................. B66F 11/044 |
| 2017/0146287 A1* | 5/2017 | Rezayat | ............... G08B 21/182 |
| 2017/0151845 A1* | 6/2017 | Allcorn | ................. B60T 8/1701 |
| 2017/0318919 A1* | 11/2017 | Gharabegian | ............. H02J 7/35 |
| 2017/0318921 A1* | 11/2017 | Gharabegian | .......... H04N 7/181 |
| 2017/0318924 A1* | 11/2017 | Gharabegian | ........ A45B 25/143 |

(Continued)

FOREIGN PATENT DOCUMENTS

| | | |
|---|---|---|
| CN | 109343155 A | 2/2019 |
| KR | 101545054 B1 | 8/2015 |

(Continued)

*Primary Examiner* — Jean Paul Cass
(74) *Attorney, Agent, or Firm* — Dinsmore & Shohl LLP (57) ABSTRACT

A method for providing wind alerts to a driver includes detecting, with one or more towable item sensors, that a towable item has been coupled to a hitch of a vehicle, detecting a wind condition with one or more wind sensors in response to detecting that the towable item has been coupled to the hitch, and outputting, with one or more output devices, an alert indicative of a high wind scenario when the wind condition is above a wind threshold.

17 Claims, 4 Drawing Sheets

(56) References Cited

U.S. PATENT DOCUMENTS

| | | | | |
|---|---|---|---|---|
| 2017/0323356 A1* | 11/2017 | Gharabegian | ....... | G06F 3/04883 |
| 2017/0324896 A1* | 11/2017 | Gharabegian | .......... | G05B 15/02 |
| 2018/0061239 A1* | 3/2018 | Prasad | ............... | G06K 9/00791 |
| 2018/0099712 A1* | 4/2018 | Bean | ................... | H04L 12/2803 |
| 2018/0148107 A1* | 5/2018 | Burrows | ................ | B62D 37/02 |
| 2018/0210447 A1* | 7/2018 | Myers | .................. | B60W 50/14 |
| 2018/0289120 A1* | 10/2018 | Gharabegian | ........ | A45B 25/143 |
| 2018/0298703 A1* | 10/2018 | Spadoni | .................. | E21B 19/00 |
| 2020/0307328 A1* | 10/2020 | Koster | ..................... | B60D 1/36 |
| 2020/0317212 A1* | 10/2020 | Rogness | ................ | B60D 1/248 |
| 2021/0048310 A1* | 2/2021 | George | ................. | B62D 63/04 |

FOREIGN PATENT DOCUMENTS

| | | | |
|---|---|---|---|
| WO | 9305492 A1 | 3/1993 | |
| WO | 2013027273 A1 | 2/2013 | |

* cited by examiner

METHODS, SYSTEMS, AND VEHICLES FOR PROVIDING WIND ALERTS TO A DRIVER OF A VEHICLE

TECHNICAL FIELD

The present specification generally relates to methods, systems, and vehicles for providing wind alerts to a driver and more specifically, methods, systems, and vehicles for providing wind alerts to a driver of a vehicle in response to a towable item being attached to a hitch of the vehicle.

BACKGROUND

Vehicles may be equipped to tow a towable item (e.g., campers, trailers, boats, etc.). When weather conditions present high wind scenarios, pulling a towable item may be become difficult. For example, strong cross-winds may cause a towable item to sway relative to the drive path of the vehicle. Too much swaying can result in overturn of the towable item and/or the vehicle. However, it may be difficult for a driver to determine if there is a high wind scenario and/or to take measures to avoid and/or alleviate the effects of a high wind scenario.

Accordingly, a need exists for alternative methods, systems, and vehicle for providing wind alerts to a driver.

SUMMARY

In one embodiment, a method for providing wind alerts to a driver includes detecting, with one or more towable item sensors, that a towable item has been coupled to a hitch of a vehicle, detecting a wind condition with one or more wind sensors in response to detecting that the towable item has been coupled to the hitch, and outputting, with one or more output devices, an alert indicative of a high wind scenario when the wind condition is above a wind threshold.

In another embodiment, a system for providing wind alerts to a driver of a vehicle includes one or more processors, one or more towable item sensors, one or more wind sensors, one or more output devices, and non-transitory one or more memory modules. The one or more towable item sensors are communicatively coupled to the one or more processors and configured to output a towable item detection signal indicative of a towable item coupled to a hitch of the vehicle. The one or more wind sensors are communicatively coupled to the one or more processors and configured to output a wind signal indicative of a wind condition. The one or more output devices are communicatively coupled to the one or more processors. The one or more memory modules are communicatively coupled to the one or more processors and store logic that, when executed by the one or more processors, cause the system to detect, with the one or more towable item sensors, that the towable item has been coupled to the hitch of the vehicle, detect a wind condition with the one or more wind sensors in response to detecting that the towable item has been coupled to the hitch, and output, with the one or more output devices, an alert indicative of a high wind scenario when the wind condition is above a wind threshold.

In yet another embodiment, a vehicle configured to provide wind alerts to a driver includes one or more processors, a hitch, one or more towable item sensors, one or more wind sensors, one or more output devices, and one or more non-transitory memory modules. The one or more towable item sensors are communicatively coupled to the one or more processors and configured to output a towable item detection signal indicative of a towable item coupled to the hitch. The one or more wind sensors are communicatively coupled to the one or more processors and configured to output a wind signal indicative of a wind condition. The one or more output devices are communicatively coupled to the one or more processors. The one or more memory modules are communicatively coupled to the one or more processors that store logic that, when executed by the one or more processors, cause the vehicle to detect, with the one or more towable item sensors, that the towable item has been coupled to the hitch, detect a wind condition with the one or more wind sensors in response to detecting that the towable item has been coupled to the hitch, and output, with the one or more output devices, an alert indicative of a high wind scenario when the wind condition is above a wind threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments as described herein are directed to methods, systems, and vehicles for providing wind alerts to a driver in response to a towable item being coupled to a hitch of a vehicle. For example, a system may include one or more processors, one or more towable item sensors, one or more wind sensors, one or more output devices, and one or more memory modules. The system may detect, with the one or more towable item sensors, that the towable item has been coupled to the hitch of the vehicle, detect a wind condition with the one or more wind sensors in response to detecting that the towable item has been coupled to the hitch, and output, with the one or more output devices, an alert indicative of a high wind scenario when the wind condition is above a wind threshold. As will be described herein, such alert may allow a user to avoid the high wind scenario and/or take remedial action to reduce effects of a high wind scenario if driving through said high wind scenario. In some embodiments, and as will be described in greater detail herein, a vehicle, such as where the vehicle is an autonomous or semi-autonomous vehicle, may automatically take action in response to detection of a high wind scenario (e.g., changing a route of the vehicle, slowing down a speed of the vehicle, or the like). Various embodiments of the methods, systems, and vehicles for providing wind alerts to a driver will be described in more detail herein.

As used herein, the phrase "towable item" refers to any item that may be attached to a vehicle by a towing hitch. This may include, but is not limited to, trailers, campers, boats, and the like.

As used herein, the phrase "high wind scenario," refers to any weather situation in which cross-winds may cause excessive swaying and/or fishtailing of a towable item relative to a drive path of a vehicle. For example, winds of greater than 15 mph, 20 mph, 25 mph, 30 mph, 35 mph, 40 mph, etc. It is noted that a towable item with a taller profile (i.e., height) may experience a greater amount of swaying than a lower profile towable item under the same wind conditions. Accordingly, a "high wind scenario" may be different for one type of towable item versus another.

Figure 1:
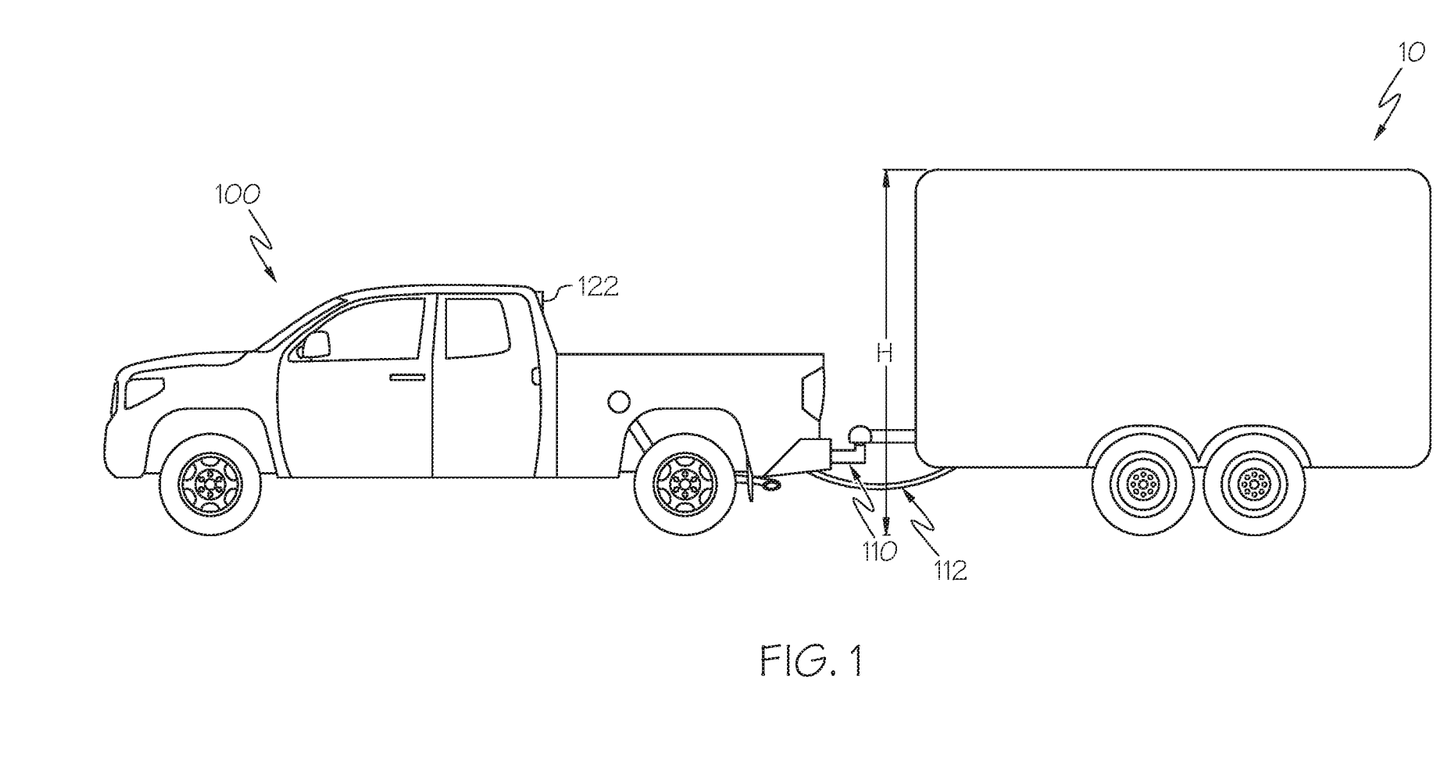
FIG. 1 depicts a vehicle with a towable item coupled to a hitch of the vehicle, according to one or more embodiments shown and described herein.

Referring now to the drawings, FIG. 1 generally depicts a towable item 10 attached to a vehicle 100 via a hitch 110. It is noted that, while the vehicle 100 depicted herein is an automobile (e.g., a truck), the vehicle 100 may be any passenger vehicle such as, for example, a terrestrial or aquatic. In some embodiments, the vehicle 100 may be an autonomous vehicle or a semi-autonomous vehicle. When referring to autonomous or semi-autonomous vehicles, it is meant to refer to vehicles having at least one drive mode wherein a human operator is not necessary to guide the vehicle 100.

The hitch 110 may be any type of vehicle 100 hitch 110 for towing a towable item. For example, the hitch 110 may be a rear receiver hitch, a front mount hitch, a fifth wheel hitch, a gooseneck hitch, a pintle hitch, a bumper hitch, a weight distribution hitch, or any other type hitch.

The towable item 10 is coupled to the vehicle 100 through the hitch 110 to allow the vehicle 100 to pull the towable item 10. As noted above, the towable item 10 may be any towable item such as, for example, a trailer, a camper, a boat, and the like. It is noted that the vehicle 100 may also be communicatively coupled to the towable item 10 via an electronic towable item harness 112 to allow a vehicle 100 operator to control various functionality of the towable item (e.g., lights, turn signals, etc.)

Figure 2:
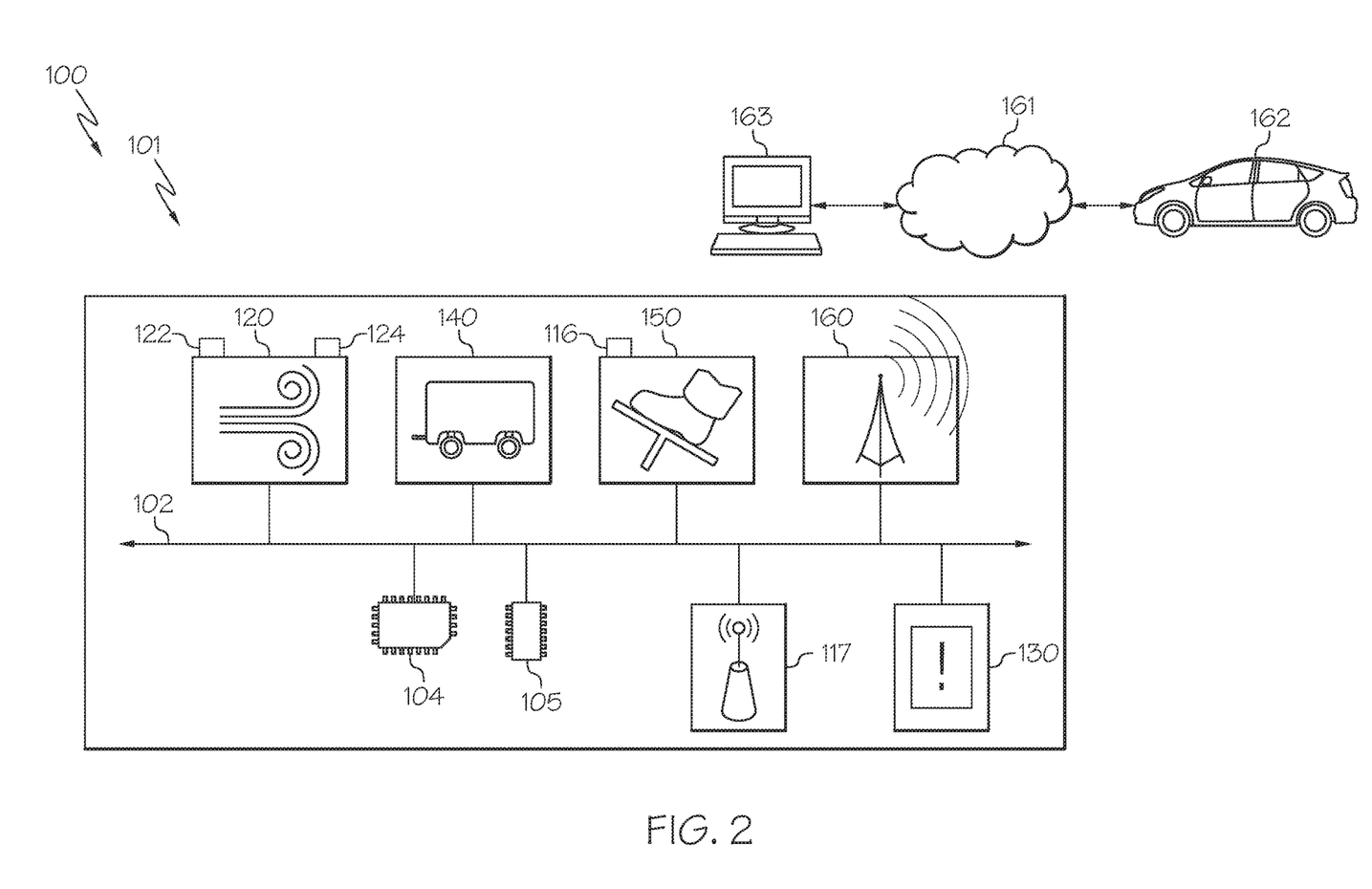
FIG. 2 schematically depicts a system for providing wind alerts to a driver of a vehicle, according to one or more embodiments shown and described herein.

FIG. 2 schematically depicts a system 101 for providing wind alerts to a driver in response to the towable item 10 being coupled to the hitch 110 of the vehicle 100. The system 101 may be directly incorporated into vehicle 100 operating systems or may be a separate therefrom. The system 101 may include a communication path 102, one or more processors 104, one or more memory modules 105, one or more wind sensors 120, one or more towable item sensors 140, and one or more output devices 130. In some embodiments, the system 101 may further include one or more drive systems 150 of the vehicle 100, and network interface hardware 160. Additional and/or fewer modules may be included without departing from the scope of the present disclosure.

The communication path 102 provides data interconnectivity between various modules of the system 101. Specifically, each of the modules can operate as a node that may send and/or receive data. In some embodiments, the communication path 102 includes a conductive material that permits the transmission of electrical data signals to processors, memories, sensors, and actuators throughout the system 101. In another embodiment, the communication path 102 can be a bus, such as for example a LIN bus, a CAN bus, a VAN bus, and the like. In further embodiments, the communication path 102 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

As noted above, the vehicle 100 may include an electronic towable item harness 112 which allows the vehicle 100 to control and/or various functions (e.g., running lights, break lights, turn signal lights, etc.) of the towable item. Accordingly, the electronic towable item harness 112 may form a portion of the communication path 102.

The one or more processors 104 are communicatively coupled with the one or more memory modules 105 over the communication path 102. The one or more processors 104 may include any device capable of executing machine-readable instructions stored on a non-transitory computer-readable medium. The one or more processors 104 may include a controller, an integrated circuit, a microchip, a computer, and/or any other computing device.

The one or more memory modules 105 are communicatively coupled to the one or more processors 104 over the communication path 102. The one or more memory modules 105 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 101 and/or external to the system 101. The embodiments described herein may utilize a distributed computing arrangement to perform any portion of the logic described herein. The one or more memory modules 105 may be configured to store one or more pieces of logic to alert a driver to a high wind scenario, as described in more detail below.

Embodiments of the present disclosure include logic stored on the one or more memory modules 105 that include machine-readable instructions and/or an algorithm written in any programming language of any generation (e.g., 1GL, 2GL, 3GL, 4GL, and/or 5GL) such as, machine language that may be directly executed by the one or more processors 104, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail herein, logic executed by the one or more processors allows the system 101 to detect the towable item 10 coupled to the vehicle 100, detect a wind condition around the vehicle 100 or along a route of the vehicle 100, and output an alert indicative of the high wind scenario to the driver.

The one or more towable item sensors 140 may be communicatively coupled to the one or more processors 104 over the communication path 102. The one or more towable item sensors 140 may include any sensor configured to output a towable item detection signal indicative of the towable item 10 being coupled to the vehicle 100. For example, the one or more towable item sensors 140 may include scanners (e.g., RFID scanners scanning for RFID tags incorporated into the towable item 10), cameras, weight sensors, pressure sensors, contact sensors, proximity sensors, or the like. As noted above, the vehicle 100 may include an electronic towable item harness 112, illustrated in FIG. 1, which allows the vehicle 100 control and/or power lights (e.g., running lights, break lights, and/or turn signal lights) of the towable item. In embodiments, the one or more towable item sensors 140 may be part of the electronic towable item harness 112 such that when the vehicle 100 is electrically coupled to the towable item (e.g., through mating plug/sockets), the one or more towable item sensors 140 may be activated to output the towable item detection signal indicative of the towable item 10 being coupled to the vehicle 100. The one or more processors 104 may execute logic stored on the one or more memory modules 105 to cause the system 101 to receive the towable item detection signal from the one or more towable item sensors 140 and detect that the towable item 10 has been coupled to the hitch 110 of the vehicle 100.

Based on detection by the system 101 that a towable item 10 is coupled to the hitch 110 of the vehicle 100, the system 101 may detect a wind condition with the one or more wind sensors 120. Accordingly, the one or more wind sensors 120 may include any sensor configured to output a wind signal indicative of a wind condition. In some embodiments one or more of the one or more wind sensors 120 may directly measure surrounding wind speed relative to the vehicle 100. For example, the one or more wind sensors 120 may include an anemometer, or other air flow type sensors for directly measuring wind speed.

In some embodiments, the one or more wind sensors 120 may include network interface hardware 160 that allows the one or more processors 104 to retrieve wind conditions from weather services, and/or other vehicles 162 (e.g., through vehicle-to-vehicle communication). For example, the network interface hardware 160 may communicatively couple the system 101 with a network 161. The network interface hardware 160 can be communicatively coupled to the communication path 102 and can be any device capable of transmitting and/or receiving data via the network 161. Accordingly, the network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks, other vehicles 162, remote servers 163, and/or devices.

For example, the system 101 may communicate, through the network interface hardware 160, with a network 161 to communicatively couple the system 101 with other vehicles 162, remote servers 163, and/or devices. In one embodiment, the network 161 is a personal area network that utilizes Bluetooth technology to communicatively couple the system 101 and a mobile device (e.g., smart phone, laptop, tablet, etc.). In other embodiments, the network 161 may include one or more computer networks (e.g., a personal area network, a local area network, or a wide area network), cellular networks, satellite networks and/or a global positioning system (e.g., GPS unit 117), and combinations thereof. Accordingly, the system 101 can be communicatively coupled to the network 161 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As noted above, in some embodiments, the network interface hardware 160 may include hardware configured to operate in accordance with the Bluetooth wireless communication protocol. In another embodiment, network interface hardware 160 may include a Bluetooth send/receive module for sending and receiving Bluetooth communications to/from a mobile device. For example, the network interface hardware 160 may communicate with a mobile device (e.g., a smart phone, tablet, etc. within the vehicle 100) to retrieve weather data including wind conditions. In some embodiments, the one more processors 104 may retrieve wind condition data from a remote server 163 over the network 161. Such weather data may include, current weather data, current wind speeds, and forecast data with predicted wind conditions.

Other vehicles may also include one or more wind sensors capable of outputting a signal indicative of a wind conditions. Through vehicle-to-vehicle communication, such information, along with GPS location information, from other vehicles may be transmitted through the network interface hardware 160 to the one or more processors 104, which may process the data to allow the system 101 to determine wind conditions around or along the route of the vehicle 100.

In yet further embodiments, the one or more wind sensors 120 may include a sensor capable of detecting a sway angle of the towable item 10 relative to a travel path 114 of the vehicle 100. For example, and with reference to FIG. 3, during travel in high wind scenarios, cross-winds may cause the towable item 10 to sway relative to a travel path 114 of the vehicle 100 by a sway angle, a. For example, the one or more wind sensors 120 may include a camera 122 (e.g., the vehicle 100 back-up camera). The one or more processors 104 may be configured to perform object recognition and/or edge processing to determine the sway angle, a, relative to the travel path 114 of the vehicle 100. A sway angle, $\alpha$, of greater than a predetermined angle (e.g., greater than 10 degrees, greater than 20 degrees, greater than 30 degrees, greater than 40 degrees, greater than 50 degrees, etc.) may indicate that the vehicle 100 is traveling through a high wind scenario which is causing an excessive amount of sway of the towable item 10 relative to the travel path 114 of the vehicle 100.

Figure 3:
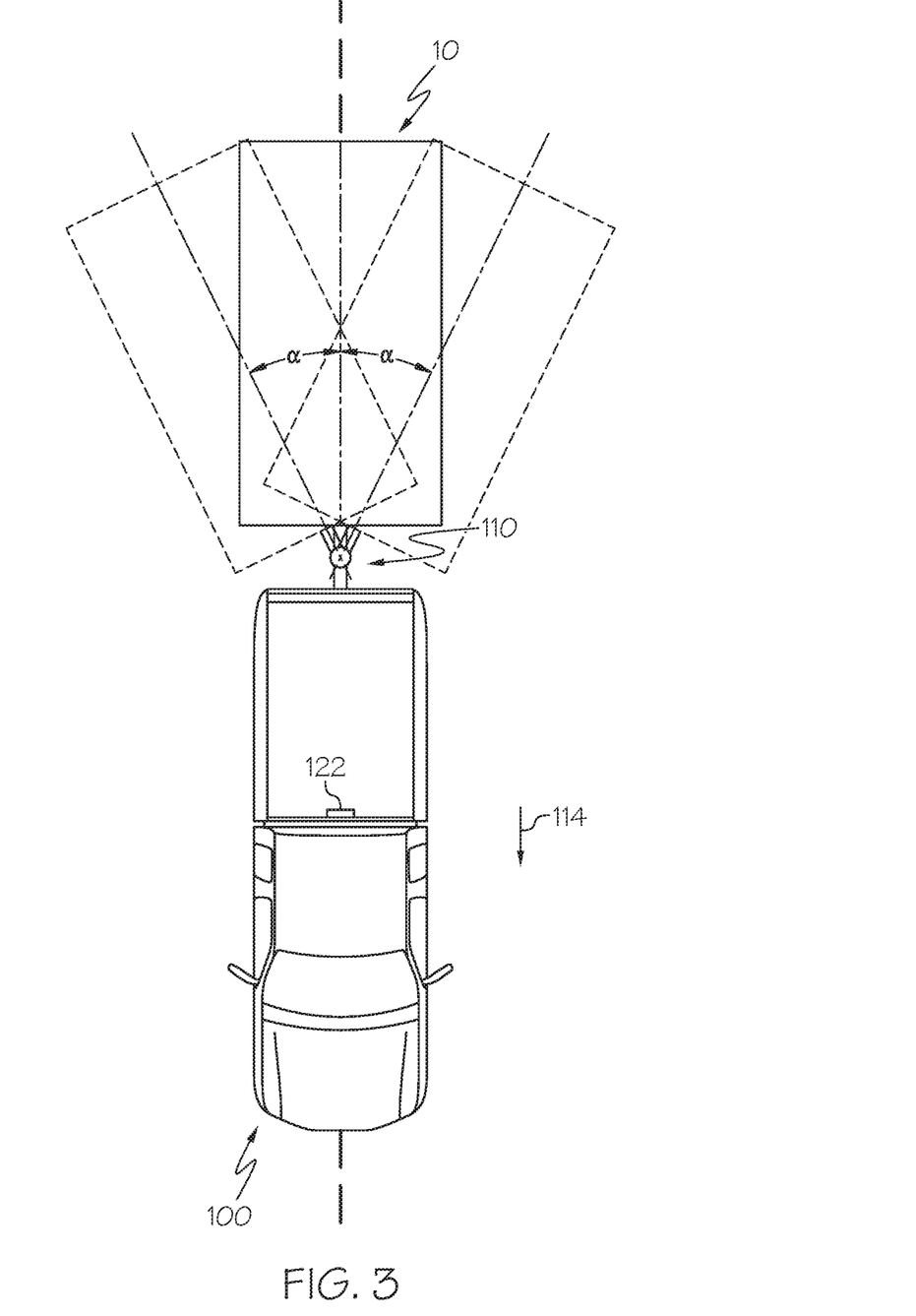
FIG. 3 depicts an aerial view of a vehicle pulling a towable item along a road, according to one or more embodiments shown and described herein.

To determine a travel path 114 of the vehicle 100, in some embodiments, there may be a steering sensor 116 communicatively coupled to the one or more processors 104 that outputs an steering angle signal. Based on the steering angle signal, the one or more processors 104 may execute logic to determine a driving direction of the vehicle 100 (e.g., along a straight road, a curving road, etc.) thereby defining the travel path 114 of the vehicle 100. When it is determined that the car is turning (e.g., based on the steering angle sign) the one or more processors 104 may determine that the sway angle, a, of the towable item 10 is resultant from turning of the vehicle 100 rather than a high wind scenario. In some embodiments, the vehicle 100 may include a GPS unit 117. In such embodiments, the travel path 114 of the vehicle 100 may be determined based on the geographic position of the vehicle 100 (e.g., the vehicle 100 is on a straight road, on a curving road, or performing a turning maneuver). Based on the geographic position of the vehicle 100, the one or more processors 104 may determine a travel path 114 of the vehicle 100 and compare the sway angle, a, to the determined travel path 114 to determine if the vehicle 100 is traveling in a high wind scenario.

In embodiments, a combination of wind sensors may be used to determine collectively a high wind scenario.

In embodiments including a GPS unit 117, a driver may be able to input a destination using any type of user input hardware (e.g., buttons, keyboards, microphones, etc.). In response to detecting that the towable item has been coupled to the hitch 110 of the vehicle 100, the one or more processors 104 may execute logic to detect a wind condition along a planned or known route to the driver's destination. Information relevant to the wind condition along the route may be based on information received over the network interface hardware 160 (e.g., from a remote server 163, other vehicles 162, etc.).

In some embodiments, the network interface hardware 160 and the GPS unit 117 may be used to monitor the wind condition around a particular radius of the vehicle 100 (e.g., within a 1 mile radius, within a 5 mile radius, within a 10 miles radius, etc.) in response to detecting that the towable item has been coupled to the hitch 110 of the vehicle 100.

As noted above, an acceptable wind threshold may be based on the type of towable item. For example, the wind threshold may be based on a height, H, of the towable item, with taller towable items having a lower wind threshold as they are typically more susceptible to swaying. For example, the camera 122 (e.g., a vehicle 100 back-up camera) or a separate camera may be used to capture image data of the towable item 10. The one or more processors 104 may be configured to process the image data to determine a height (e.g., height plus load height for open trailers) of the towable item 10. Based on the determined height of the towable item, the one or more processors 104 may calculate a wind threshold which may indicate an acceptable wind speed maximum or an acceptable sway angle maximum for the particular towable item 10. In some embodiments, information relating to height, acceptable wind speeds, sway angles, or the like may be communicated from the towable item through the electronic towable item harness 112. For example, the towable item 10 may include one or more memory modules 105 that store such information that may be communicatively coupled to the one or more processors 104 through the electronic towable item harness 112.

In some embodiments, the one or more wind sensors 120 may include a load sensor 124, which may output a signal indicative of the weight of the towable item (e.g., the weight being pulled by the vehicle). Accordingly, the one or more processors 104 may use the weight of the towable item in calculation of the wind threshold has heavier towable items may be less susceptible to swaying than lower weight towable items. The system 101 may use both weight and height to determine an appropriate wind threshold.

As noted above, the system 101 may include one or more output devices 130 to communicate an alert to a driver of the vehicle 100 of a high wind scenario when the wind condition is determined to be above a wind threshold. The one or more user output devices may include any device capable of providing visual, audible, or haptic feedback, for example, to indicate to the driver that the driver is traveling through or will be traveling through a high wind scenario. For example, the one or more output devices 130 may include one or more displays, speakers, haptic feedback modules, or the like. The one or more output devices 130 may be part of the vehicle's infotainment system.

The alert may be accompanied by suggestions for remedial or alternative actions. For example, the alert may suggest that the driver slow down. In some embodiments, the one or more processors 104 may cause the system 101 to output alternative routes to the driver's destination to avoid the high wind scenario.

When a driver receives an alert of a high wind scenario around the vehicle 100 or along the vehicle's route, the driver may take remedial action by, for example, reducing the speed of the vehicle 100 to increase stability or alter that route of the vehicle 100 to avoid or leave the high wind scenario. In some embodiments, such as where the vehicle 100 is an autonomous or semi-autonomous vehicle, the one or more processors 104 may cause the system 101 to automatically adjust operation of the vehicle 100. For example, upon detection of a high wind scenario around the vehicle 100, the system 101 may communicate with one or more drive systems 150 (e.g., steering systems, breaking systems, propulsion systems, or the like) of the vehicle 100 to automatically reduce the speed of the vehicle 100, alter a course of the vehicle 100, or the like when the wind condition is determined to be above the threshold.

Figure 4:
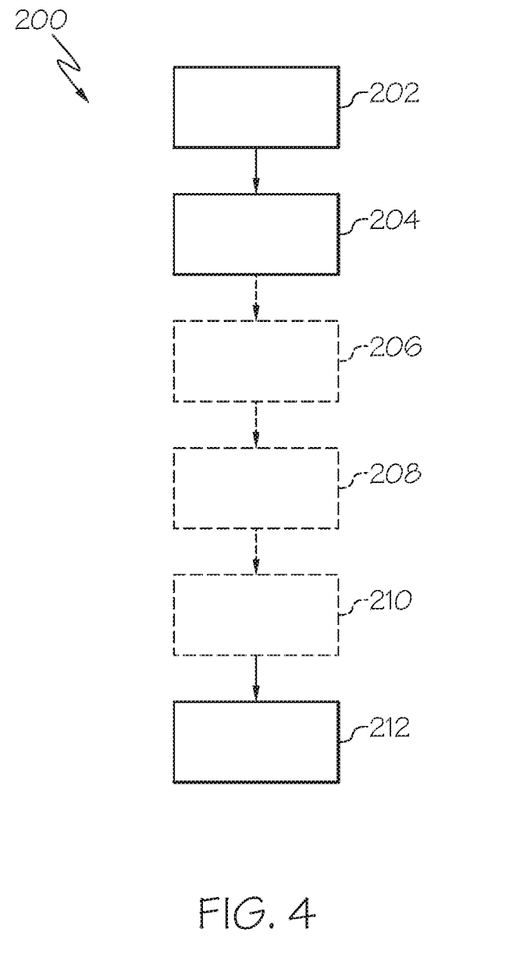
FIG. 4 depicts a method for proving a wind alert to a driver, according to one or more embodiments shown and described herein.

FIG. 4 illustrates a flow chart depicting a method 200 for providing wind alerts to the driver. It is noted that while a particular numbers of steps in a particular order are depicted, additional and/or fewer steps may be included without departing from the scope of the present disclosure.

At step 202, the method 200 includes detecting, with the one or more towable item sensors 140, that the towable item has been coupled to the hitch 110 of the vehicle 100. For example, when the electronic towable item harness 112 electronically couples the towable item to the system 101, the one or more processors 104 may determine that the towable item is coupled to the hitch 110 of the vehicle 100. However, other sensors (e.g., cameras, weight sensors, etc.) as described above may be used.

In response to detecting the towable item has been coupled to the hitch 110 of the vehicle 100, at step 204, the method 200 includes detecting the wind condition with the one or more wind sensors 120. As noted above, the one or more wind sensors 120 may directly detect wind speeds in the vicinity of the vehicle 100, or the system 101 may communicate through network interface hardware 160 to retrieve wind data from other vehicles 162, remote servers 163, or the like. In some embodiments, the one or more wind sensors 120 may detect a sway angle, a, of the towable item. As noted above, when the sway angle, a, is greater than a predetermined threshold, the one or more processors 104 may cause the system 101 to determine that the vehicle is in a high wind scenario.

In some embodiments, the vehicle 100 may be equipped with a GPS unit 117. In such embodiments, the method 200 at step 206 may include monitoring an environment radius around the vehicle 100 in response to detecting that the towable item has been coupled to the hitch 110. For example, where the vehicle 100 includes a GPS unit 117, the one or more processors 104 may determine a radius (e.g., a 5 miles radius, a 10 mile radius, etc.) around the vehicle 100 a monitor wind conditions within that radius (e.g., through vehicle-to-vehicle communication and/or communication with a remote server 163). Where the driver's destination is known or is determinable (e.g., based on historical driver data), the vehicle 100 may determine the driver's destination and detect a wind condition along the route to the driver's destination.

In some embodiments, the method 200 may include determining the wind threshold to which the wind conditions may be compared to determine a high wind scenario at step 210. For example, and as described above, not every towable item may have the same wind concerns. That is, lower profile towable items may not be as effected by high winds a larger profile towable items. Accordingly in some embodiments, determining the wind threshold may include detecting a height of the towable item with the one or more wind sensors 120 (e.g., a camera 122), determining a weight of the towable item, and determining the wind threshold based on their height and/or the weight of the towable item. In other embodiments, a wind threshold may not be reliant on the height and/or weight of the towable item.

It is noted that in some embodiments, the system 101 may automatically periodically monitor wind conditions instead of waiting until a towable item is attached to the vehicle 100. For example, vehicles having higher profiles may also benefit from retrieving wind condition information and alerting the same to the user.

The method 200 further includes at step 212 outputting, with the one or more output devices 130, an alert indicative of a high wind scenario when the wind condition is above a wind threshold in response to detecting that the towable item 10 is coupled to the hitch 110 of the vehicle 100. That is, when the vehicle 100 determines that the wind in the vicinity of the vehicle 100 and/or along the route of the vehicle 100 is too high, the system 101 may output an alert (e.g., visual, audible, haptic) indicating the same to the driver.

In some embodiments, the one or more processors 104 may determine an alternative route to the user's destination and output a prompt indicating the availability of the alternative route to the driver. The user may be able to input with one or more user input devices (e.g., buttons, keyboards, etc.) acceptance and/or rejection of the alternative route.

In some embodiments, such as where the vehicle 100 is an autonomous or semi-autonomous vehicle, the system 101 can interact with one or more vehicle 100 drive systems 150 to take action in response to the detected high wind scenario. For example, the system 101 can interact with the vehicle 100 braking and/or propulsion system to slow a speed of the vehicle 100 to reduce the sway that may otherwise be experienced by the towable item 10. In some embodiments, the vehicle 100 may automatically update the route of the vehicle 100 or output a prompt for an alternative route to avoid or leave a high wind scenario.

It should now be understood that embodiments as described herein are directed to methods, systems, and vehicles for providing wind alerts to a driver in response to a towable item being coupled to a hitch of a vehicle. The system may detect, with one or more towable item sensors, that a towable item has been coupled to a hitch of a vehicle, detect a wind condition with one or more wind sensors in response to detecting that the towable item has been coupled to the hitch, and output, with one or more output devices, an alert indicative of a high wind scenario when the wind condition is above a wind threshold. Such alert may allow a user to avoid the high wind scenario and/or take remedial action to reduce effects of a high wind scenario if driving through said high wind scenario. In some embodiments, a vehicle, such as where the vehicle is an autonomous or semi-autonomous vehicle, may automatically take action in response to detection of a high wind scenario (e.g., changing a route of the vehicle, slowing down a speed of the vehicle, or the like).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing wind alerts to a driver, the method comprising:
    detecting, with one or more towable item sensors, that a towable item has been coupled to a hitch of a vehicle;
    detecting a wind condition with one or more wind sensors as a result of detecting that the towable item has been coupled to the hitch;
    monitoring an environment radius around the vehicle in response to detecting that the towable item has been coupled to the hitch; and
    outputting, with one or more output devices, an alert indicative of a high wind scenario when the wind condition is above a wind threshold.

2. The method of claim 1, wherein the towable item is detectable by the one or more towable item sensors through an electronic towable item harness of the vehicle.

3. The method of claim 1, further comprising:
    determining a driver's destination;
    detecting the wind condition along a route to the driver's destination; and
    outputting a prompt within the one or more output devices suggesting an alternative route to the driver's destination.

4. The method of claim 1, wherein detecting the wind condition with the one or more wind sensors comprises detecting a sway angle of the towable item.

5. The method of claim 1, further comprising reducing a speed of the vehicle when the wind condition is above the wind threshold.

6. The method claim 1, further comprising:
    detecting a height of the towable item with a camera; and
    determining the wind threshold based on the height of the towable item.

7. A system for providing wind alerts to a driver of a vehicle, the system comprising:
    one or more processors;
    one or more towable item sensors communicatively coupled to the one or more processors and configured to output a towable item detection signal indicative of a towable item coupled to a hitch of the vehicle;
    one or more wind sensors communicatively coupled to the one or more processors and configured to output a wind signal indicative of a wind condition;
    one or more output devices communicatively coupled to the one or more processors; and one or more non-transitory memory modules communicatively coupled to the one or more processors that store logic that, when executed by the one or more processors, cause the system to:
  detect, with the one or more towable item sensors, that the towable item has been coupled to the hitch of the vehicle;
  detect the wind condition with the one or more wind sensors as a result of detecting that the towable item has been coupled to the hitch;
  monitor an environment radius around the vehicle in response to detecting that the towable item has been coupled to the hitch; and
  output, with the one or more output devices, an alert indicative of a high wind scenario when the wind condition is above a wind threshold.

8. The system of claim 7, wherein the one or more towable item sensors are part of an electronic towable item harness of the vehicle.

9. The system of claim 7, further comprising a GPS unit communicatively coupled to the one or more processors, wherein the system is further caused to:
  determining a driver's destination based on the GPS unit;
  detect the wind condition along a route to the driver's destination; and
  output a prompt within the one or more output devices suggesting an alternative route to the driver's destination.

10. The system of claim 7, wherein the system is further caused to detect a sway angle of the towable item with the one or more wind sensors.

11. The system claim 7, wherein the system is further caused to:
  detect a height of the towable item with a camera; and
  determine the wind threshold based on the height of the towable item.

12. A vehicle configured to provide wind alerts to a driver, the vehicle comprising:
  one or more processors;
  a hitch;
  one or more towable item sensors communicatively coupled to the one or more processors and configured to output a towable item detection signal indicative of a towable item coupled to the hitch;
  one or more wind sensors communicatively coupled to the one or more processors and configured to output a wind signal indicative of a wind condition;
  one or more output devices communicatively coupled to the one or more processors; and
  one or more non-transitory memory modules communicatively coupled to the one or more processors that store logic that, when executed by the one or more processors, cause the vehicle to:
    detect, with the one or more towable item sensors, that the towable item has been coupled to the hitch;
    detect the wind condition with the one or more wind sensors as a result of detecting that the towable item has been coupled to the hitch;
    monitor an environment radius around the vehicle in response to detecting that the towable item has been coupled to the hitch; and
    output, with the one or more output devices, an alert indicative of a high wind scenario when the wind condition is above a wind threshold.

13. The vehicle of claim 12, further comprising an electronic towable item harness, wherein the one or more towable item sensors are part of the electronic towable item harness.

14. The vehicle of claim 12, further comprising a GPS unit communicatively coupled to the one or more processors, wherein the vehicle is further caused to:
  determine a driver's destination based on the GPS unit;
  detect the wind condition along a route to the driver's destination; and
  output a prompt within the one or more output devices suggesting an alternative route to the driver's destination.

15. The vehicle of claim 12, wherein the vehicle is further caused to detect a sway angle of the towable item with the one or more wind sensors.

16. The vehicle claim 12, wherein the vehicle is further caused to:
  detect a height of the towable item with a camera; and
  determine the wind threshold based on the height of the towable item.

17. The vehicle of claim 12, further comprising one or more drive systems communicatively coupled to the one or more processors, wherein the vehicle is caused to reduce a speed of the vehicle with the one or more drive systems when the wind condition is above the wind threshold.

* * * * *

UNITED STATES PATENT AND TRADEMARK OFFICE
CERTIFICATE OF CORRECTION

PATENT NO. : 11,274,937 B2
APPLICATION NO. : 16/543108
DATED : March 15, 2022
INVENTOR(S) : Livesey George It is certified that error appears in the above-identified patent and that said Letters Patent is hereby corrected as shown below:

In the Specification

In Column 6, Line(s) 41, after "angle,", delete "a." and insert --α.--, therefor.

In Column 6, Line(s) 45, after "angle,", delete "a," and insert --α,--, therefor.

In Column 6, Line(s) 57, before "steering", delete "an" and insert --a--, therefor.

In Column 6, Line(s) 64, after "angle,", delete "a," and insert --α,--, therefor.

In Column 7, Line(s) 6, after "angle,", delete "a," and insert --α,--, therefor.

In Column 8, Line(s) 51, after "angle,", delete "a," and insert --α,--, therefor.

In Column 8, Line(s) 52, after "angle,", delete "a," and insert --α,--, therefor.

Signed and Sealed this
Twenty-fourth Day of May, 2022

Katherine Kelly Vidal
*Director of the United States Patent and Trademark Office*